United States Patent
Yasumoto et al.

(10) Patent No.: US 6,455,109 B1
(45) Date of Patent: *Sep. 24, 2002

(54) ELECTRODE FOR FUEL CELL AND METHOD OF PRODUCING THE SAME

(75) Inventors: Eiichi Yasumoto, Katano; Hisaaki Gyoten, Shijonawate; Makoto Uchida, Hirakata; Yasushi Sugawara, Neyagawa; Yasutomo Funakoshi, Sakai; Kouji Nakagawa, Osaka; Toshihiro Matsumoto, Ibaraki, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,996

(22) Filed: Mar. 30, 1999

(30) Foreign Application Priority Data

Mar. 31, 1998 (JP) .............................................. 10-087509

(51) Int. Cl.⁷ .............................. B05D 1/04; B05D 5/12
(52) U.S. Cl. ........................ 427/475; 427/485; 427/115
(58) Field of Search ................... 427/459, 475, 427/485, 486, 113, 115, 122; 429/41, 44, 45, 42, 30, 33; 29/623.5, 33, 42; 361/227; 502/101

(56) References Cited

U.S. PATENT DOCUMENTS

| 4,272,353 A | * | 6/1981 | Lawrence et al. |
| 4,313,972 A | * | 2/1982 | Goller et al. |
| 4,489,122 A | * | 12/1984 | Kammin et al. |
| 5,151,515 A | * | 9/1992 | Cisar |
| 5,171,644 A | * | 12/1992 | Tsou et al. |
| 5,316,871 A | * | 5/1994 | Swathirajan et al. |
| 5,372,896 A | * | 12/1994 | Binder et al. |
| 5,542,163 A | * | 8/1996 | Chang |
| 5,738,905 A | * | 4/1998 | Bevers |

FOREIGN PATENT DOCUMENTS

| DE | 19509748 | * | 10/1996 |
| EP | 03295168 | | 12/1991 |
| EP | 0 637 851 A1 | | 6/1994 |
| EP | 637851 | * | 8/1995 |
| JP | 3-295 168 | * | 12/1991 |
| JP | 3-295168 | * | 12/1991 |
| WO | WO 96/37003 | | 11/1996 |
| WO | WO96/37003 | | 11/1996 |

OTHER PUBLICATIONS

Kirk–Othmer Encyclopedia of Chemical Technology, 3$^{rd}$ Edition, vol. 19, pp. 1–2, 18–19, 1982.*

* cited by examiner

Primary Examiner—Fred J. Parker
(74) Attorney, Agent, or Firm—McDermott, Will & Emery (57) ABSTRACT

A method of producing an electrode having a high performance in a simple and convenient manner which does not require the use of any of the medium, surfactant and pore-producing agent is disclosed. In the disclosed method, a layer including a catalyst powder is formed on a surface of a polymer electrolyte film or a porous conductive electrode substrate by supplying an electrostatically-charged catalyst powder to the polymer electrolyte film or the porous conductive electrode substrate. Alternatively, a layer including a catalyst powder is formed on a surface of a polymer electrolyte film or a porous conductive electrode substrate by spraying the catalyst powder on the surface of the polymer electrolyte film or the porous conductive electrode substrate together with a carrier gas, thereby to cause the catalyst powder to adhere to the surface.

20 Claims, 4 Drawing Sheets

FIG. 6

ELECTRODE FOR FUEL CELL AND METHOD OF PRODUCING THE SAME

BACKGROUND OF THE INVENTION

The present invention relates to an electrode for a polymer electrolyte fuel cell and a method of producing the same.

In general, the electrode for the polymer electrolyte fuel cell is produced by coating a porous conductive electrode substrate with a carbon fine powder carrying a noble metal.

In the production of such electrodes, when the electrode is directly formed on the surface of polymer electrolyte by means of printing, a large area where the electrode reaction takes place can be secured. It is however very difficult to form an electrode on the polymer electrolyte film in viewpoint of a swelling property or fastening property of the polymer electrolyte film.

For that reason, these electrodes are usually produced by coating the electrode substrate employing the screen printing process or transfer printing (offset) process with an ink prepared by dispersing the carbon fine powder carrying the noble metal in an organic medium such as isopropyl alcohol.

In a case of using an organic medium as the dispersing medium for the ink, a protecting gear for operators, an exhausting equipment and the like have to be used for a safety measure. In recent years, the organic medium has therefore been replaced by an aqueous medium which has a higher safety.

To the ink using either of the organic medium or the aqueous medium, an ionic or nonionic surfactant has previously been added in the ink for improving a dispersibility of the carbon fine powder carrying noble metal.

If the organic medium or the surfactant used during the production of the electrode remains in the produced electrode, it deteriorates the performance of the assembled fuel cell. In a case of producing the electrode by using the organic medium, it is necessary to remove the organic medium in the coated film on the electrode substrate by drying the film in viewpoint of securing safety in the subsequent production steps or that of deterioration in cell performance due to the remained medium.

In addition, to the ink, a pore-producing agent has previously been added for forming micropores in the electrode so that diffusion of gas should not be prevented in the electrode. The pore-producing agent included in the formed layer of electrode must be removed by baking or washing.

Alternatively, there is a method for producing a film electrode by coating a resin film with a slurry of the catalyst powder by means of the doctor blading process or the like. The film electrode thus obtained is adhered on the polymer electrolyte film by hot pressing or the like. In this method, there is also a need for using a pore-producing agent or a surfactant.

As described above, the production of the electrodes for the polymer electrolyte fuel cells has hereto been very man-power consuming operation. In addition, a closest attention has been required for the safety measure.

The present invention intends to solve the abovementioned problems in the conventional production of the electrode for the fuel cell. An object of the present invention is to provide a method of producing an electrode having a high performance in a simple and convenient manner, which does not require the use of any of the medium, surfactant and pore-producing agent.

BRIEF SUMMARY OF THE INVENTION

The method of producing an electrode for a fuel cell in accordance with the present invention comprises the step of applying an electrostatically-charged catalyst powder onto a surface of a polymer electrolyte film or a porous conductive electrode substrate to form a layer including the catalyst powder on the polymer electrolyte film or the porous conductive electrode substrate.

For instance, the electrostatically-charged catalyst powder is supplied to the vicinity of the polymer electrolyte film or porous conductive electrode substrate which is grounded, thereby causing the catalyst powder to be absorbed on the surface of the polymer electrolyte film or the porous conductive electrode substrate by an electrostatic force Alternatively, the electrostatically-charged catalyst powder is adhered to a roll, and the adhered catalyst powder is then offset-printed onto the polymer electrolyte film or the porous conductive electrode substrate.

Another method of producing an electrode for a fuel cell in accordance with the present invention comprises the step of spraying a catalyst powder together with a carrier gas onto a surface of a polymer electrolyte film or a porous conductive electrode substrate to adhere the catalyst powder to the surface, thereby to form a layer including the catalyst powder on the surface of the polymer electrolyte film or the porous conductive electrode substrate.

For spraying the catalyst powder, for instance, a spray gun is employed. By appropriately controlling the spray gun, it is possible to uniformly form an electrode having a large area.

In a case of spraying the catalyst powder onto the polymer electrolyte film, in particular, particles of the catalyst powder are embedded in the film. By this procedure, the cell performance is further improved.

In this method also, it is preferable to use the electrostatically-charged catalyst powder.

Since the method of producing the electrode in accordance with the present invention is a fully dry process, there is no need for employing an organic medium. Therefore, safety in the operation is improved. In addition, a drying step for removing the organic medium remaining in the formed electrode can be dispensed with. Further, according to the method of the present invention, there is no need for employing any of surfactants or pore-producing agents. Therefore, a step of removing these can also be dispensed with. In addition, the method is superior to any conventional methods in economical viewpoint, because it is possible to recover the catalyst powder which was not utilized for forming the electrode with ease.

In addition, the formation of the electrode on the polymer electrolyte film, which had heretofore been difficult, can easily be performed without any concern for the swelling or the like disadvantages. Although the smoothness and density of the electrode film obtained in accordance with the method of the present invention are inferior to that obtained by printing, the gas-diffusion property of the electrode is conversely improved, and thus the present method is superior to the printing process as the production method for an electrode.

In addition, the performance of the fuel cell configured with the electrode of the present invention is superior to those of the fuel cells configured with the conventional electrodes.

The catalyst powder includes a carbon fine powder carrying a noble metal such as platinum, ruthenium, gold, palladium or the like. In addition, it is preferable that the catalyst powder further includes a carbon fine powder coated with a polymer electrolyte or a fluorocarbon resin such as polytetrafluoroethylene. The electrode layer may be configured by laminating layers including various catalyst powders.

The catalyst powder is preferably prepared by mixing a carbon fine powder carrying a noble metal with a colloidal dispersion of the polymer electrolyte and then drying the mixture.

In a preferred mode of the present invention, the method includes the further step of heating the layer of catalyst powder and the polymer electrolyte film to further the adhesion of the catalyst powder to the polymer electrolyte film. By this further heating step, an electrode having higher performance is obtained. More preferably, the method further comprises, in advance of the heating step, the steps of applying a polymer electrolyte solution on the surface of the polymer electrolyte film and then drying to evaporate the solvent from the solution.

According to the method of the present invention, it is possible to produce an electrode for a fuel cell without using any solvent or surfactant which is considered to impose an adverse influence on the cell performance. In addition, since an electrode structure being preferable for the gas diffusion can be realized without employing the pore-producing agent, the product is an optimum as the electrode for the fuel cell.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In the following paragraphs, a description will be made on the preferred embodiments of the method of producing an electrode for a fuel cell in accordance with the present invention in detail with reference to the attached drawings.

EXAMPLE 1

In this example, a description will be made on an embodiment of the method of producing the electrode for the fuel cell, which employs the electrostatically-charged catalyst powder.

Figure 1:
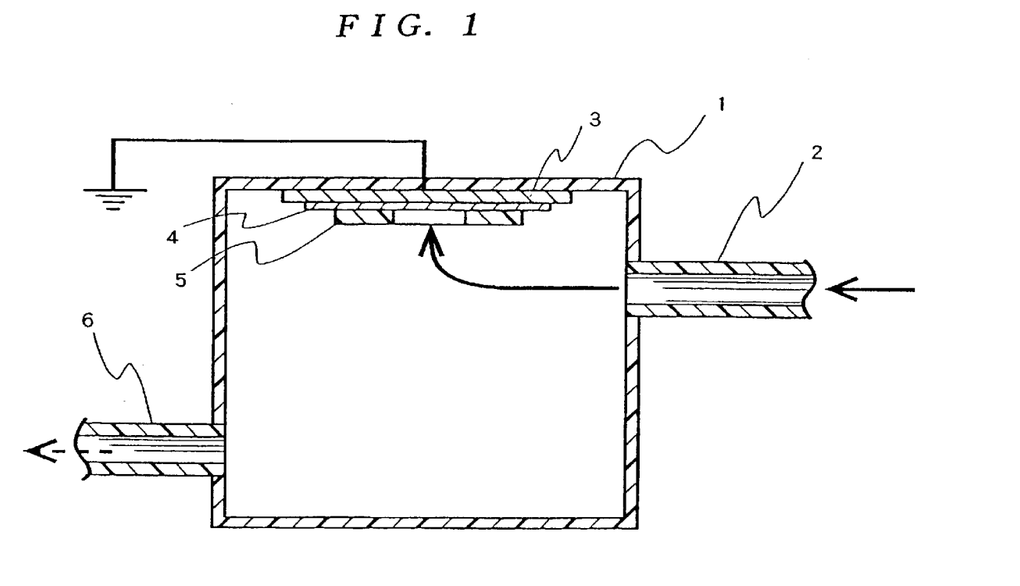
FIG. 1 is a longitudinal cross-sectional view for schematically showing an equipment used for forming an electrode layer in an embodiment of the present invention.

By employing the equipment shown in FIG. 1, an *electrode layer was formed on a polymer electrolyte film in the following manner.

First, the catalyst powder was fed into a chamber 1 together with a carrier gas of nitrogen at a high speed, through a supply tube 2 made of, for instance, polytetrafluoroethylene (hereinafter referred to as "PTFE"). During the passage of the catalyst powder through the supply tube 2, the powder was negatively charged by friction with the inner wall of the supply tube 2.

Beneath the top wall of the chamber 1, there was provided a metal holder 3 which is grounded. A square polymer electrolyte film 4 with a side of 120 mm was fixed beneath the holder 3. A mask 5 having a square opening with a side of 60 mm was fixed on the surface of the polymer electrolyte film 4. The carrier gas fed into the chamber 1 was then exhausted therefrom through an exhaust pipe 6.

The catalyst powder fed into the chamber 1 with pressure through the supply tube 2 was adsorbed onto the polymer electrolyte film 4 fixed on the holder 3 by electrostatic force.

The catalyst powder was obtained by mixing a carbon fine powder carrying platinum on the surface thereof at 25 wt% with an ethanol solution of the polymer electrolyte, perfluoroionomer at 5 wt% (available from Aldrich Co.,. Ltd. under the name of Nafion solution), and then drying the mixture, thereby to coat the surface of the carbon powder with the polymer electrolyte. As the polymer electrolyte film 4, Nafion 112 film (available from E. I. Du Pont de Nemours & Company) was used. The thickness of the electrode layer thus formed was about 30 $\mu$m.

After forming the electrode layer on one surface of the polymer electrolyte film 4 in this manner, another electrode layer was formed on the other surface in a similar manner. Next, by arranging carbon papers having a thickness of 360 $\mu$m (available from Toray Industries, Inc.) and being cut to the same size as the polymer electrolyte film on the surfaces of the pair of electrode layers formed on the polymer electrolyte film 4, and sandwiching the electrodes and the polymer electrolyte film with these papers, a single cell was assembled. In this configuration, the carbon papers had previously been subjected to a water-repelling treatment by immersing them in an aqueous dispersion of copolymer of tetrafluoroethylene-hexafluoropropylene (ND-1, available from DAIKIN INDUSTRIES, LTD.) and then thermally treating them.

Comparative Example

For the purpose of comparison, an electrode was formed by the screen printing process which is currently in general use.

Since it is difficult to directly print onto the polymer electrolyte film by the screen printing process, an ink was printed on an electrode substrate instead, as has been widely performed conventionally. First, the ink was prepared by mixing a catalyst powder and butanol in the thrice amount of the powder, with a few drops of a surfactant (NP-10, available from Nihon Surfactant Kogyo K. K.) in a ball mill. The obtained ink was then printed on a carbon paper by using a screen of 100 mesh.

Subsequently, by removing the solvent remaining in the printed film by drying at 80° C., an electrode layer was formed. Then a single cell similar to that of Example 1 was assembled by sandwiching a polymer electrolyte film similar to that used in Example 1 with a pair of carbon papers arranged on both surfaces of the polymer electrolyte film, so that the electrode layers formed in the above-mentioned manner may confront each other. Hydrogen gas is supplied to one electrode, the fuel electrode, while air is supplied to the other electrode, the air electrode.

Figure 2:
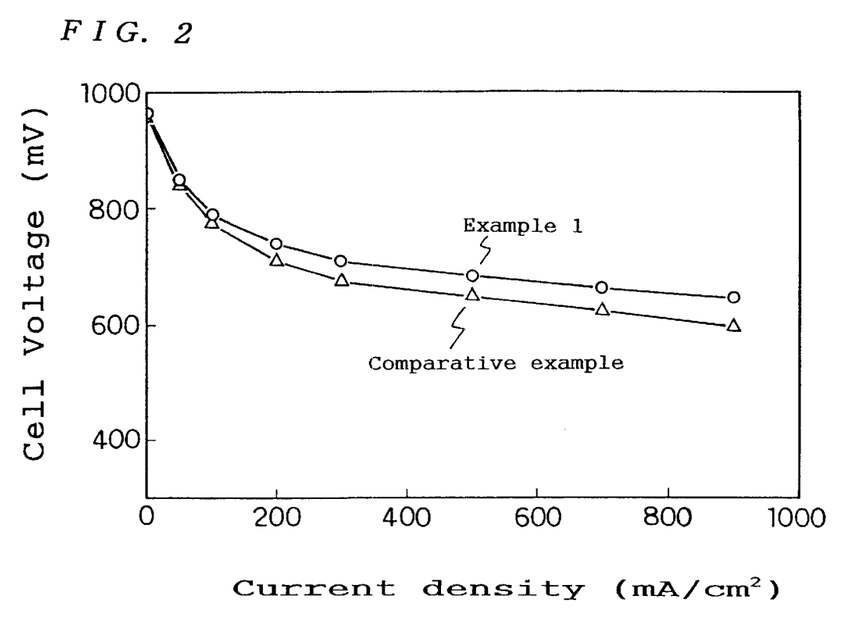
FIG. 2 is a characteristic diagram showing the relationship between the current density and voltage of a polymer electrolyte fuel cell in the same embodiment of the present invention.

The current density and cell voltage characteristics of the single cells obtained in this comparative example are shown in FIG. 2. During the test, the temperature of the cell was kept at 80° C., and hydrogen gas was moistened as to make its dew point 75° C. was supplied to one the fuel electrode in such a manner that the utilization rate thereof is 90 %, while air was moistened as to make its dew point 65° C. and was supplied to the air electrode in such a manner that the utilization rate thereof is 30%.

As clearly shown in FIG. 2, the single cell in accordance with Example 1 demonstrates superior performance to that of the single cell of Comparative Example which employs the electrode formed by the screen printing process.

EXAMPLE 2

In this example, a description will be made on another embodiment of the method of producing the electrode for the fuel cell by using an electrostatically-charged catalyst powder.

An electrode layer was formed by adhering the charged catalyst powder to a carbon paper by using an equipment similar to that used in Example 1. By using the pair of carbon papers on which the electrode layers were formed in this manner, a single cell similar to that of Example 1 was assembled.

Figure 3:
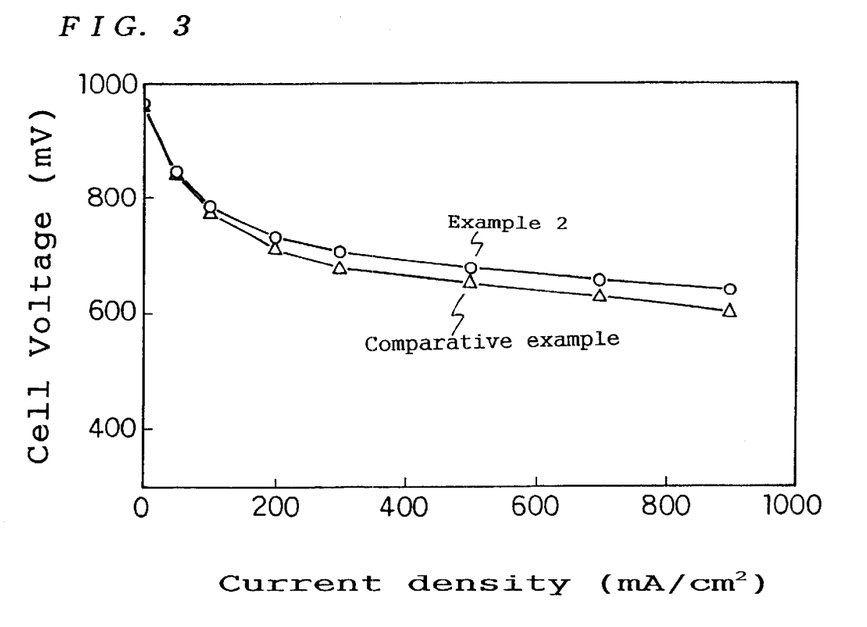
FIG. 3 is a characteristic diagram showing the relationship between the current density and voltage of a polymer electrolyte fuel cell in another embodiment of the present invention.

The characteristic of the single cell thus obtained together with that of the above-mentioned Comparative Example are shown in FIG. 3. As clearly shown in FIG. 3, the single cell in accordance with this example is superior in cell performance than that of Comparative Example.

As a result of the observation on the surface and the cross-section of the formed electrode layers, it is confirmed that the electrode layer formed by using the charged catalyst powder in this example has more fine pores than the electrode layer formed by the screen printing process in Comparative Example. Based on this confirmation, it is believed that in the electrode layer obtained in this example, a gas can be diffused more smoothly as compared with the electrode layer obtained in Comparative Example.

EXAMPLE 3

In this example, a description will be made on an embodiment of the method of forming an electrode layer by spraying a catalyst powder directly onto a polymer electrolyte film.

An electrode layer was formed on a polymer electrolyte film, by spraying the catalyst powder similar to that used in Example 1 onto the polymer electrolyte film covered with a mask having a square opening with a side of 60 mm by means of spray gun using nitrogen as a carrier gas. In this process, the distance between the polymer electrolyte film and the nozzle of the spray gun was fixed to 40 cm and the time period for the spraying was set to 3 seconds.

After forming the electrode layers on both surfaces of the polymer electrolyte film, respectively, a single cell similar to that of Example 1 was assembled by sandwiching the electrode layers with carbon papers.

Figure 4:
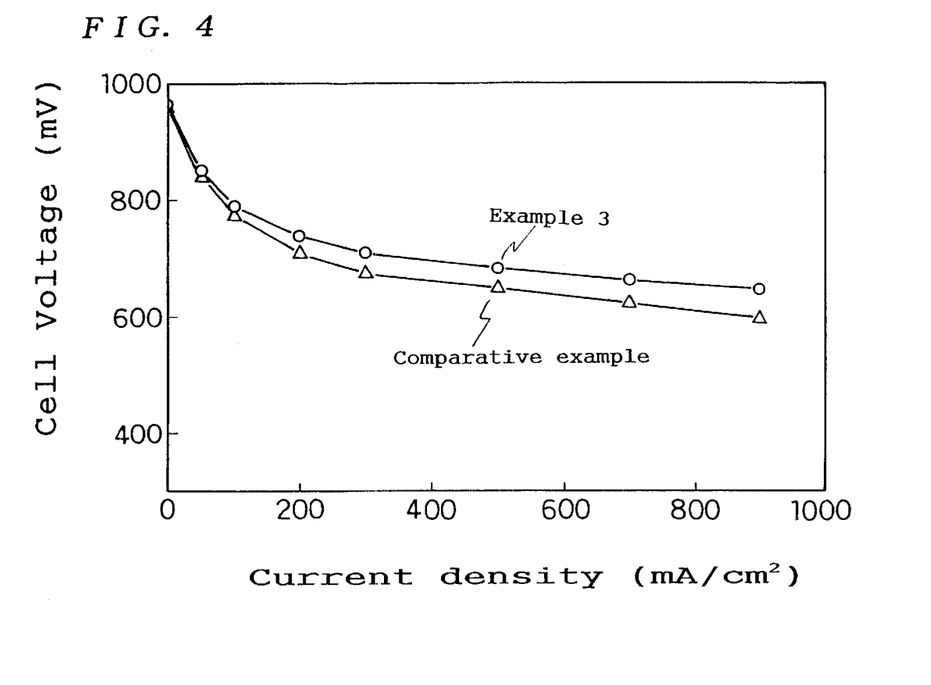
FIG. 4 is a characteristic diagram showing the relationship between the current density and voltage of a polymer electrolyte fuel cell in a still other embodiment of the present invention.

The characteristic of the single cell thus obtained is shown in FIG. 4 together with that of the above-mentioned Comparative Example. As clearly shown in FIG. 4, the single cell in this example is superior in cell performance than that of the Comparative Example.

The observation on the surface and the cross-section of the electrode layers formed in accordance with this example made it apparent that the catalyst powder was fixed to the polymer electrolyte film in such a manner that the respective particles of the powder are stuck into or partly embedded in the film. In addition, it was also confirmed that the electrode layer formed in accordance with greater pores than the electrode layer formed by the screen printing process in Comparative Example. Based on this confirmation, it is believed that, a gas can be diffused more smoothly in the electrode layer obtained in accordance with this example as compared with the electrode layer obtained in Comparative Example.

EXAMPLE 4

In this example, a description will be made on another embodiment of the method of forming an electrode layer by spraying a catalyst powder directly onto an electrode substrate.

The catalyst powder was sprayed using spray gun similar to that used in Example 3 on a square carbon paper with a side of 60 mm thereby to form an electrode layer. In this process, the conditions for the spraying were the same as those in Example 3.

Using the carbon papers on the surfaces of which the electrode layers were formed, a single cell was assembled in a[]manner similar to that of Example 2. The investigation on the characteristic of the single cell thus obtained made it apparent that the cell voltage is 0.70 V at a current density of 0.3 A/cm$^2$. Based on this findings, it is confirmed that the single cell in this example demonstrates a cell characteristic substantially equal to that of the single cell in Example 3.

EXAMPLE 5

In this example, a description will be made on an embodiment of a combination of the method of forming an electrode layer by using the charged catalyst powder and the method of directly spraying a catalyst powder for forming an electrode layer, either one of which has just been illustrated in the above-mentioned examples.

Using a spray gun similar to that used in Example 3, the catalyst powder was sprayed onto the grounded polymer electrolyte film, thereby forming an electrode layer on a polymer electrolyte film. That is, while feeding the catalyst powder similar to that used in Example 1 into the spray gun through a supply tube of PTFE at a high speed, the catalyst powder was sprayed onto the polymer electrolyte film by the spray gun under the condition similar to that of Example 3, thereby forming a electrode layer of the film. By using the polymer electrolyte film on both surfaces of which the electrode layers were formed, a single cell was assembled in a manner similar to that of Example 1. The characteristic of the obtained single cell is shown in FIG. 5.

Figure 5:
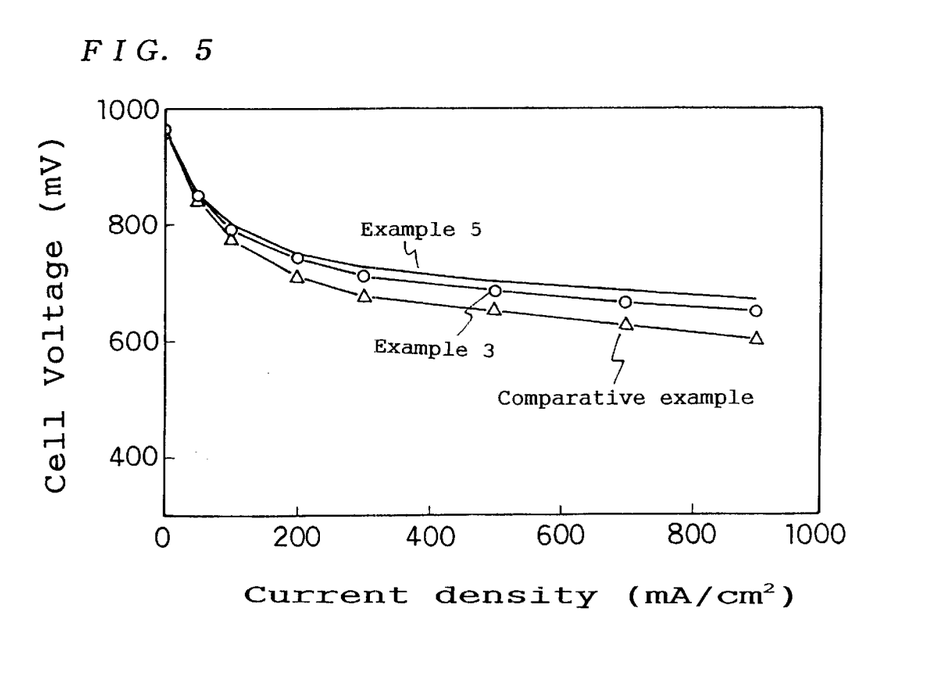
FIG. 5 is a characteristic diagram showing the relationship between the current density and voltage of a polymer electrolyte fuel cell in a further embodiment of the present invention.

For comparison, FIG. 5 also shows characteristics of the cell of Example 3 and the cell of the Comparative Example. As clearly shown in FIG. 5, the single cell in this example is superior in the cell performance than that of Example 3 and that of the Comparative Example.

In addition, it is also confirmed that a single cell configured with an electrode formed by spraying the charged catalyst powder onto a carbon paper demonstrates superior characteristic than the single cell of Example 4 and that of Comparative Example.

Next, by using the catalyst powders listed below, the electrode layers were formed on both surfaces of the polymer electrolyte film in a manner similar to those described in the above.

Powder A: a carbon powder carrying platinum similar to that already described.

Powder B,: a platinum-carrying carbon powder, the surface of which is coated with a polymer electrolyte, which has been prepared by mixing-the above-mentioned carbon powder with the NAFION solution, and then drying the mixture.

Powder C: a mixture of the platinum-carrying carbon powder and a PTFE-coated carbon powder, the surfaces of both are coated with the polymer electrolyte, which has been prepared by mixing the mixture of the platinum-carrying carbon powder and the PTFE-coated carbon powder with the NAFION solution, and then drying the mixture.

By using the above-mentioned respective powders, an electrode layer was formed on each surface of the polymer electrolyte films, and single cells were assembled by using thus treated polymer electrolyte film. The characteristics of the assembled fuel cell were investigated. The cell voltages under discharging the cells at a current density of 0.3 A/cm$^2$ are listed in Table 1 below, together with that of the cell of the Comparative Example configured with the electrode obtained by the screen printing process.

TABLE 1

| Electrode powder | Cell voltage |
| --- | --- |
| Powder A | 710 mV |
| Powder B | 725 mV |
| Powder C | 730 mV |
| Comparative Example | 675 mV |

As indicated by the data in Table 1, any of the single cells using either one of Powders "A" through "C" demonstrates a higher performance than that of the single cell of the Comparative Example. The cell which uses Powder C in particular is superior to the cells using Powder "A" and Powder "BW". It is believed that the advantage is due to the fact that Powder "C" includes the PTFE-carrying carbon powder, and thus the electrode layer consisting mainly of the powder is excellent in water-repelling property and gas diffusing property inside the layer. This tendency is also similarly confirmed in a case of forming the electrode layer on the carbon paper.

In addition, by using a catalyst powder "D" prepared in the following manner, an electrode layer was formed on a polymer electrolyte film and used for assembling a single cell.

First, a platinum-carrying carbon powder was dispersed in butyl acetate. By dropwise adding a 9 wt% ethanol solution of a polymer electrolyte, perfluoroionomer (Flemion solution, available from Asahi Glass Co., Ltd.) to the dispersion, a colloidal polymer electrolyte was caused to carry on the platinum-carrying carbon powder. By drying the powder under vacuum at 100° C., Powder "D" was obtained.

As a result of the investigation on the characteristic of the single cell assembled by using Powder "D", it is found that the single cell demonstrates a performance superior to that configured with the electrode produced by using Powder "B". The cell voltage under discharging the cells at a current density of 0.3 A/cm$^2$ was 730 mV. It is believed that the advantage in cell performance of the cell using the catalyst powder which has previously been coated with such a colloidal polymer electrolyte is due to an improvement in utilization rate of platinum caused by a change in fine structure of the electrode layer.

EXAMPLE 6

In this example, a description will be made on an embodiment of a preferred treatment to be performed after the formation of the electrode layer.

Electrode layers were formed by spraying the catalyst powder onto each surfaces of the polymer electrolyte film in a manner similar to that of Example 3 by means of spray gun.

The polymer electrode film with the electrode layers formed on both surfaces was sandwiched between a pair of carbon papers (film thickness of 360 μm, available from Toray Industries, Inc.) which had been subjected to a water-repelling treatment and cut to be the same size as the electrode layers and the laminate was placed in a pair of metal dies to be pressed under a pressure of 50 kg/cm$^2$ at 130° C. for 1 minutes. By this procedure, the polymer electrolyte film and the pair of the carbon papers were adhered together.

Figure 6:
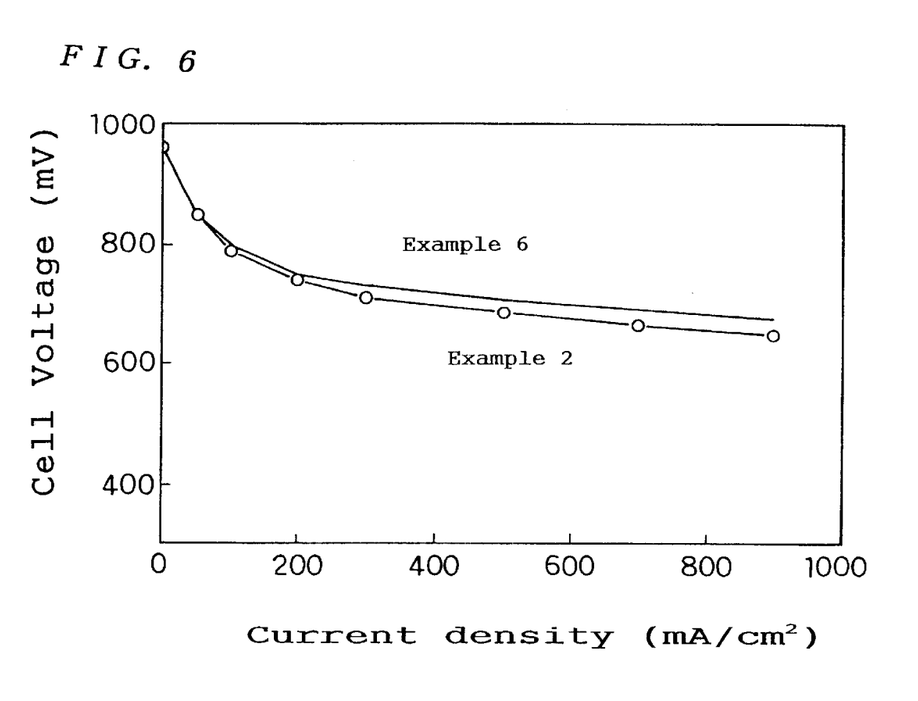
FIG. 6 is a characteristic diagram showing the relationship between the current density and voltage of a polymer electrolyte fuel cell of a still further embodiment.

By assembling a single cell with the mutually adhered polymer electrolyte film and the carbon papers in a manner similar to that in Example 3, the cell characteristic thereof was investigated. The result is shown in FIG. 6. For comparative purpose, the characteristic of the single cell of Example 3, i.e., the single cell which has not been subjected to hot pressing is also shown. As clearly shown the diagram, in FIG. 6, the cell of this example exhibits a higher performance than that of the cell of Example 3. It is believed that this advantage is due to closer joining of the polymer electrolyte film with the electrode layers and enlargement of microscopic electrode reaction area caused by performing the hot pressing.

Next, another polymer electrolyte film and the pair of the similar carbon papers were adhered together to be an integral body, by forming the electrode layers on the film and subjecting the laminate to hot pressing. In this case, however, both surfaces of the polymer electrolyte film had been previously treated with a polymer electrolyte in a solvent (Flemion solution, available from Asahi Glass Co., Ltd.) and the solvent removed by drying. Then, a single cell was assembled by using the same, and the characteristic of the obtained cell was investigated. As a result, it was confirmed that the characteristic of the cell having the polymer electrolyte film which had been pretreated with the polymer electrolyte solution was better than the cell having the polymer electrolyte film which had not been pretreated.

It is understood that various other modification will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of producing an electrode for a fuel cell comprising the step of applying an electrostatically-charged catalyst powder containing a polymer electrolyte onto a surface of a polymer electrolyte film to form a layer including the catalyst powder on said polymer electrolyte film, said electrostatically-charged catalyst powder having a sufficient charge so as to cause said catalyst powder to be electrostatically attracted to said surface of said polymer electrolyte film.

2. The method of producing an electrode for a fuel cell in accordance with claim 1, wherein said catalyst powder includes a carbon fine powder carrying a noble metal.

3. The method of producing an electrode for a fuel cell in accordance with claim 1, wherein said catalyst powder further includes a carbon powder coated with a fluorocarbon resin.

4. The method of producing an electrode for a fuel cell in accordance with claim 1, wherein said catalyst powder has been prepared by mixing a carbon powder carrying a noble metal with a colloidal dispersion of a polymer electrolyte and then drying the mixture.

5. The method of producing an electrode for a fuel cell in accordance with claim 1, comprising the further step of heating said layer.

6. The method of producing an electrode for a fuel cell in accordance with claim 5 further comprising the steps of applying a polymer electrolyte solution on the surface of said polymer electrolyte film and then drying before said heating step.

7. The method of producing an electrode for a fuel cell according to claim 1, wherein said electrostatically-charged catalyst powder has a sufficient charge so as to bond said catalyst powder to said surface of said polymer electrolyte film.

8. A method of producing an electrode for a fuel cell comprising the step of spraying a catalyst powder together with a carrier gas and a polymer electrolyte onto a surface of a polymer electrolyte film to adhere said catalyst powder to said surface of said polymer electrolyte film, thereby to form a layer including the catalyst powder on said surface.

9. The method of producing an electrode for a fuel cell in accordance with claim 8, wherein said catalyst powder is electrostatically-charged.

10. The method of producing an electrode for a fuel cell in accordance with claim 8, wherein said catalyst powder includes a carbon powder carrying a noble metal.

11. The method of producing an electrode for a fuel cell in accordance with claim 8, wherein said catalyst powder further includes a carbon powder coated with a fluorocarbon resin.

12. The method of producing an electrode for a fuel cell in accordance with claim 8, wherein said catalyst powder has been prepared by mixing a carbon powder carrying a noble metal with a colloidal dispersion of a polymer electrolyte and then drying the mixture.

13. The method of producing an electrode for a fuel cell in accordance with claim 8 comprising the further step of heating said layer.

14. The method of producing an electrode for a fuel cell in accordance with claim 13, further comprising the steps of applying a polymer electrolyte solution on the surface of said polymer electrolyte film and then drying before said heating step.

15. A method of producing an electrode for a fuel cell comprising the steps of forming a catalyst powder comprising a catalyst powder containing a polymer electrolyte, electrostatically charging said powder, applying said electrostatically-charged catalyst powder onto a surface of a polymer electrolyte film or a porous conductive electrode substrate to form a layer including the catalyst powder on said polymer electrolyte film or said porous conductive electrode substrate, said electrostatically-charged catalyst powder having a sufficient charge so as to be electrostatically attracted to said surface of said polymer electrolyte film.

16. The method of producing an electrode for a fuel cell in accordance with claim 15, wherein said catalyst powder includes a carbon powder coated with a fluorocarbon resin.

17. The method of producing an electrode for a fuel cell according to claim 15, wherein said electrostatically-charged catalyst powder has a sufficient charge so as to bond said catalyst powder to said surface of said polymer electrolyte film.

18. A method of producing an electrode for a fuel cell comprising the steps of spraying a catalyst powder comprising a polymer electrolyte together with a carrier gas onto a surface of a polymer electrolyte film or a porous conductive electrode substrate to form a layer including said catalyst powder on said polymer electrolyte film or said porous conductive electrode substrate.

19. The method of producing an electrode for a fuel cell in accordance with claim 18, wherein said catalyst powder includes a carbon powder coated with a fluorocarbon resin.

20. The method of producing an electrode for a fuel cell in accordance with claim 18, wherein said catalyst powder is electrostatically-charged.

* * * * *

UNITED STATES PATENT AND TRADEMARK OFFICE
CERTIFICATE OF CORRECTION

PATENT NO.    : 6,455,109 B1                                                Page 1 of 1
DATED         : September 24, 2002
INVENTOR(S)   : Eiichi Yasumoto et al.

It is certified that error appears in the above-identified patent and that said Letters Patent is hereby corrected as shown below:

Title page,
Item [56], FOREIGN PATENT DOCUMENTS, remove the duplicate listing of "WO96/37003  11/1996";

Column 8,
Line 67, after "carbon", delete "fine";

Column 10,
Line 18, after "having a sufficient charge so as to", insert -- cause said catalyst powder to --

Signed and Sealed this

First Day of April, 2003

JAMES E. ROGAN
*Director of the United States Patent and Trademark Office*